United States Patent
Meilhac et al.

(10) Patent No.: US 9,680,709 B2
(45) Date of Patent: Jun. 13, 2017

(54) EARLY FRAME BANDWIDTH ASSESSMENT IN A MULTI-BANDWIDTH WIRELESS LOCAL AREA NETWORK

(71) Applicants: Lisa Meilhac, Biot (FR); Cedric Vandeburie, Biot (FR)

(72) Inventors: Lisa Meilhac, Biot (FR); Cedric Vandeburie, Biot (FR)

(73) Assignee: RIVIERAWAVES (RW), Biot (FR)

( * ) Notice: Subject to any disclaimer, the term of this patent is extended or adjusted under 35 U.S.C. 154(b) by 211 days.

(21) Appl. No.: 14/541,485

(22) Filed: Nov. 14, 2014

(65) Prior Publication Data

US 2015/0139008 A1    May 21, 2015

(30) Foreign Application Priority Data

Nov. 15, 2013 (EP) ..................................... 13306565

(51) Int. Cl.
*H04L 12/24* (2006.01)
*H04L 27/26* (2006.01)
(Continued)

(52) U.S. Cl.
CPC ........ *H04L 41/0896* (2013.01); *H04L 27/261* (2013.01); *H04L 27/2666* (2013.01);
(Continued)

(58) Field of Classification Search
CPC ............. H04L 41/0896; H04L 43/0882; H04L 27/2666; H04L 27/261; H04W 84/12;
(Continued)

(56) References Cited

U.S. PATENT DOCUMENTS 7,079,052 B2 * 7/2006 Lamy ...................... H03M 7/40
341/65
7,283,790 B2 * 10/2007 Chevalier ........... H04L 25/0204
375/224

(Continued)

FOREIGN PATENT DOCUMENTS

WO    2011/156201 A2    12/2011

OTHER PUBLICATIONS

Next Generation Wireless LANs, Throughput, Robustness, and Reliability in 802.11n, Eldad Perahia and Robert Stacey, Cambridge University Press, Cambridge, New York, Melbourne, Madrid, Cape Town, Singapore, Sao Paulo, Published in the United States of America by Cambridge University Press, New York.

(Continued)

*Primary Examiner* — Brian O'Connor
(74) *Attorney, Agent, or Firm* — Young & Thompson

(57) ABSTRACT

A method for determining the bandwidth of an incoming frame in a wireless local area network (WLAN), includes the following steps, executed at least by a processor, upon reception of a first plurality of samples representative of a first signal of the frame received at a primary WLAN channel, and of a second plurality of samples of the frame representative of a second signal of the frame received at a secondary WLAN channel:

computing at least a correlation of a sample among the first plurality of samples with a sample among the second plurality of samples;

if the correlation exceeds a threshold then setting a receiver mode to a first bandwidth otherwise setting a receiver mode to a second bandwidth.

A device for setting the bandwidth of a receiver for a wireless local area network and a system integrating such device are also described.

20 Claims, 8 Drawing Sheets

(51) Int. Cl.
*H04W 84/12* (2009.01)
*H04L 12/26* (2006.01)
*H04W 28/20* (2009.01)
*H04W 76/04* (2009.01)
*H04W 88/06* (2009.01)
*H04B 1/709* (2011.01)
*H04B 1/7093* (2011.01)

(52) U.S. Cl.
CPC ......... *H04L 43/0882* (2013.01); *H04W 84/12* (2013.01); *H04B 1/709* (2013.01); *H04B 2001/70935* (2013.01); *H04W 28/20* (2013.01); *H04W 76/04* (2013.01); *H04W 88/06* (2013.01)

(58) Field of Classification Search
CPC ..... H04W 88/06; H04W 76/04; H04W 28/20; H04B 2001/70935; H04B 1/709
See application file for complete search history.

(56) References Cited

U.S. PATENT DOCUMENTS

| | | | | |
|---|---|---|---|---|
| 7,539,167 | B2 * | 5/2009 | Meilhac | H04B 1/7085 |
| | | | | 370/335 |
| 7,742,388 | B2 * | 6/2010 | Shearer | H04L 27/2602 |
| | | | | 370/204 |
| 7,940,794 | B2 | 5/2011 | Zhang et al. | |
| 8,275,323 | B1 | 9/2012 | Shirali et al. | |
| 8,345,584 | B2 * | 1/2013 | Rohfleisch | H04B 7/024 |
| | | | | 370/310 |
| 8,526,515 | B2 * | 9/2013 | Calando | H04B 7/0805 |
| | | | | 375/260 |
| 8,811,245 | B2 * | 8/2014 | Rohfleisch | H04B 7/024 |
| | | | | 370/310 |
| 2007/0060162 | A1 | 3/2007 | Xhafa et al. | |
| 2009/0046681 | A1 * | 2/2009 | Kalogridis | H04W 72/1289 |
| | | | | 370/338 |
| 2011/0096685 | A1 | 4/2011 | Lee et al. | |
| 2012/0026824 | A1 | 2/2012 | Gauvin et al. | |
| 2012/0176974 | A1 * | 7/2012 | Abraham | H04W 16/02 |
| | | | | 370/329 |
| 2012/0269124 | A1 | 10/2012 | Porat | |
| 2013/0142186 | A1 * | 6/2013 | Rohfleisch | H04B 7/024 |
| | | | | 370/338 |
| 2014/0192820 | A1 * | 7/2014 | Azizi | C12N 15/74 |
| | | | | 370/445 |
| 2015/0003434 | A1 * | 1/2015 | Shi | H04W 48/16 |
| | | | | 370/338 |
| 2015/0110051 | A1 * | 4/2015 | Azizi | C12N 15/74 |
| | | | | 370/329 |
| 2016/0050692 | A1 * | 2/2016 | Azizi | H04W 74/0816 |
| | | | | 370/329 |
| 2016/0212703 | A1 * | 7/2016 | Seok | H04W 52/0225 |

OTHER PUBLICATIONS

EP Search Report, dated May 20, 2014, from corresponding EP application.

* cited by examiner

EARLY FRAME BANDWIDTH ASSESSMENT IN A MULTI-BANDWIDTH WIRELESS LOCAL AREA NETWORK

FIELD OF THE INVENTION

The present invention relates generally to wireless local area networks or WLANs that comply with a series of standards globally known as "802.11" issued by the US Institute of Electrical and Electronics Engineers or IEEE. The invention more specifically relates to products developed for later versions of the standards (i.e.: 802.11n and 802.11ac), defining communication channel widths larger than the initial single specification of 20 MHz and which must thus achieve interoperability between products while being capable of fully taking advantage of the performance improvement brought by the wider channels (40 MHz and more).

BACKGROUND OF THE INVENTION

The IEEE 802.11 standards are used internationally to set the characteristics of wireless local area networks or WLANs and allow interoperability of all the computing devices wirelessly connecting to them. Also often designated as "Wi-Fi networks" this latter appellation makes reference to the certification given by the "Wi-Fi Alliance", a trade association aimed at certifying interoperability between devices adhering to the 802.11 standards. The label "Wi-Fi" is delivered to materials that meet the corresponding specifications. A Wi-Fi network is thus not different of a network based on the 802.11 standards.

Thanks to 802.11 standards, it has been possible to create wireless LANs offering broadband connections. This type of networks has become very popular in open areas hosting potentially a high concentration of users like stations, airports, hotels, trains, etc. Users are thus given the opportunity to establish a wireless network with a broadband connection to the Internet within an area, typically covering several tens of meters indoors, in the vicinity of an access point (AP) or "hotspot". With the evolution of the standards, the speed of the connection a user can establish has increased, in practice, from a few megabits per second (Mb/s) with the early version of the standards up to hundreds of Mb/s with 802.11n, a version which was officially released in late 2009.

To allow 802.11 broadband connections to reach the highest speed values mentioned above, 802.11n version of the standards has introduced the possibility of wider communication channels. While initially being of 20 MHz the channel width can optionally be doubled thus brought to 40 MHz. A more recent evolution of the standards, namely the 802.11ac version, has extended this possibility to channel widths of 80 and 160 MHz.

Then, in an 802.11 compliant WLAN, this poses the problem of interoperability of the various communications devices forming a wireless network, i.e., a basic service set (BSS) comprised of all the stations (STAs), such as laptop computers or smart phones, participating to the wireless network at any point of time and of an access point (AP) acting as a master to control the stations within the BSS. More specifically, all communications devices must then be able to detect on the fly, for each data frame received, which type of bandwidth is actually used.

Thus, the invention is generally aimed at assessing on the fly the bandwidth of each received frame in an environment where 802.11n has introduced optional 40 MHz channel width operation of basic service set or BSS complying with this version of the standards. However, BSS must also maintain interoperability with older or legacy stations and with high throughput (HT) stations that operate only with 20 MHz channel. Such BSS must be capable of accommodating three basic classes of device: 20 MHz legacy or non-HT stations, 20 MHz HT stations, and 20/40 MHz HT stations.

Hence, in this latter case, in an 802.11n 40 MHz BSS, a 20/40 MHz STA or AP has to be capable of transmitting and receiving, indifferently, 40 MHz frames in a 40 MHz channel, and 20 MHz frames in a 20 MHz primary channel defined within the 40 MHz one.

FIGS. 1a to 1c illustrate the frequency location of the 20 MHz primary channel in a 40 MHz BSS compared to the 40 MHz channel 100. The 20 MHz primary channel 120 can occupy either the lower 114 or the upper band 116 of the 40 MHz band 110 depending on the BSS configuration. The other defines a secondary channel 130.

Although the central frequency of the 20 and 40 MHz channels are then different and because it would not practically feasible nor convenient to adapt the characteristics of the radiofrequency (RF) components, i.e.: RF synthesizer frequency and cut-off frequency of the analog filter, to each transmit or receive frame, a 20/40 MHz capable STA keeps maintaining its RF carrier frequency to the central frequency 112 of the 40 MHz frames. This is particularly relevant in reception mode since a 20/40 MHz capable STA has no way of predicting if the bandwidth of the next incoming frame is going to be 40 or 20 MHz.

FIGS. 2a to 2c illustrate the cases corresponding to the version 802.11ac of the standards where 80 MHz capable BSS can be formed. Then, in an 802.11 ac 80 MHz BSS, a 20/40/80 MHz capable STA or AP must be able to transmit and receive indifferently 80, 40 and 20 MHz frames, respectively, in the 80 MHz main channel 200, in the 40 MHz primary channel 210 and in the 20 MHz primary channel 220. FIGS. 2a to 2c are just an example of location of the different channels. Primary and secondary locations can be reserved, but the 20 MHz primary channel must be within the 40 MHz primary channel. This version of the standards also allows the aggregation of two 80 MHz channels to obtain a 160 MHz channel (not shown).

To perform the reception of the above various frame types the modem receive path of a STA or AP capable of operating in a multi-channel-widths environment must be configured as a function of the bandwidth of the frames to be demodulated. For example, the demodulation of a 20 MHz frame requires settling computational resources to perform a 64-point Fast Fourier Transform (FFT), whereas the demodulation of an 80 MHz frame requires that a 256-point FFT be performed.

However, as already discussed, in the case of 802.11n and later versions of the standard, modem receivers do not know in advance the actual bandwidth of a next incoming frame. Although this information is indeed contained, as shown in FIG. 3, in the so-called HT-SIG (or VHT-SIGA with 802.11 ac version of the protocol) fields 340 that precede the data symbols 350 of each received frame, depending on the architecture and implementation of the modem, this information may in practice come too late to be readily usable.

Hence, having to wait that SIG fields 340 be demodulated to configure the modem in accordance with the current bandwidth of the received frame, in order to demodulate properly the following data symbols, is not actually a viable solution. The standard frame format is the so-called mixed format (MF) 320 shown in FIG. 3. A so-called, shorter, Green-field (GF) frame format 310 is also used for which the above problem is even more stringent since this type of frame contains the HT-LTF field (High Throughput Long Training Field) before the HT-SIG (High Throughput SIG field). Also, one must ensure good backward compatibility with the 802.11 legacy frames 330 corresponding to the previous versions of the standards, namely the 802.11a to g versions.

Thus, it is a particular object of the invention to disclose a method to assess the bandwidth of an incoming frame on the basis of its preamble section 330, i.e., prior to the decoding of the above SIG fields.

Further objects, features and advantages of the present invention will become apparent to the ones skilled in the art upon examination of the following description in reference to the accompanying drawings. It is intended that any additional advantages be incorporated herein.

SUMMARY OF THE INVENTION

According to an embodiment, the invention relates to a method for determining the bandwidth of an incoming frame in a wireless local area network (WLAN), preferably a in a multi-bandwidth 802.11 wireless network. The method comprises the following steps upon reception of a first plurality and a second plurality of samples of the frame, the first plurality of samples being representative of a first signal of the frame received at a primary WLAN channel and the second plurality of samples being representative of a second signal of the frame received at a secondary WLAN channel:
  computing at least a correlation of a sample among the first plurality of samples with a sample among the second plurality of samples;
  if the correlation exceeds a threshold then setting a receiver mode to a first bandwidth otherwise setting a receiver mode to a second bandwidth.

Therefore, the invention computes a cross-correlation of a signal received on the primary channel, also referred to as primary band, with a signal received on the secondary channel or secondary band.

Thus, the multiplication of said samples among the first and second pluralities of samples is taken into account for computing the correlation.

The solution of the invention provides an accurate assessment of the frame bandwidth while limiting the complexity of the computation and cost of the device executing that computation. Indeed, compared to a solution wherein the computation correlates two samples of the same channel at various times, the invention allows simplifying the computation process and reduce therefore the surface of the silicon used to form the device, decreasing thereby the cost of the device.

Additionally, the present invention provides a significant advantage compared to a solution requiring two computations of correlation of samples of the same channel at various time. Indeed, a solution using auto-correlation requires having at least two samples delayed by 0.8 μs to perform an auto-correlation with a time lag of 0.8 μs. Then, an efficient solution would require averaging several successive auto-correlation results to improve the accuracy of the estimation. This means that an auto-correlation based bandwidth detector could provide a first result in at least 1.6 μs. The present invention allows providing an accurate estimation faster since it does not require waiting for a time lag.

In addition, compared to a solution requiring two computations of correlation of samples of the same channel at various time, a correlation being computed for each of the two channels and a comparison with a threshold being calculated for each correlation, the invention only requires to calculate one single correlation and to perform one single comparison for both channels. Indeed, according to one specific embodiment of the invention, there is only one correlator to compute the at least one correlation.

Therefore, the invention enhances the performances of solutions for assessing the frame bandwidth.

In addition, the invention allows assessing the frame bandwidth in real time, during the reception of the preamble of the frame, advantageously the first field of the frame. The frame bandwidth is therefore identified at an earlier stage of the reception.

Optionally, the invention may comprise any one of the following features and steps that can be taken separately or in combination:

According to an embodiment, the frame is formed of a plurality of fields and the steps of computing a correlation and of setting a receiver mode are executed and preferably completed during the reception of a first field of the frame. More precisely, these steps are executed during the reception of the first field of the preamble of the frame.

According to an embodiment, the first field of the frame is a short training field (L-STF; GF-HT-STF). According to an embodiment, the second field of the frame is a long training field (L-LTF; HT-LTF1) and a subsequent field comprises a SIG field. Therefore, the SIG field (HT-SIG) that usually contains information regarding the bandwidth of the frame is received after the first field (short training field) during which the computation and the assessment of the frame bandwidth are executed.

According to an embodiment, said samples among the first and second pluralities of samples are complex signals and the correlation comprises multiplying:
  one among said sample among the first plurality of samples and said sample among the second plurality of samples with:
  the conjugate of the other among said sample among the first plurality of samples and said sample among the second plurality of samples.

Preferably, the correlation comprises: multiplying said sample among the first plurality of samples with the conjugate of said sample among the second plurality of samples.

According to an embodiment, said samples among the first and second pluralities of samples are complex signals and said threshold is computed by calculating the square of the modulus of at least a sample among the first plurality of samples representative of a first signal received at a primary WLAN channel and/or among the second plurality of samples representative of a second signal received at a secondary WLAN channel.

Advantageously, the first and second pluralities of samples are sampled from an input signal of the incoming frame at a first sampling rate. In addition, said threshold is calculated by multiplying a weighting factor by the sum of the powers of samples sampled from the input signal of the incoming frame at a second sampling rate, the first and second sampling rates being equal. Since the accumulation is done on the same period it is then not necessary to divide by the period duration before comparing both components which allows speeding up and simplifying the computation.

According to an embodiment, the first WLAN channel is a 20 MHz bandwidth primary channel of a 40 MHz bandwidth channel, the second WLAN channel is a 20 MHz bandwidth second channel of the 40 MHz bandwidth channel, said first bandwidth being 40 MHz and said second bandwidth being 20 MHz. Alternatively, the first WLAN channel is a 40 MHz bandwidth primary channel of a 80

MHz bandwidth channel, the second WLAN channel is a 40 MHz bandwidth second channel of the 80 MHz bandwidth channel, said first bandwidth being 80 MHz and said second bandwidth being 40 MHz.

According to an embodiment, the step of computing at least a correlation comprises computing simultaneously a plurality of correlations, and the samples among the first and second pluralities of samples taken into account for each correlation of the plurality of correlations present a different relative delay. This feature allows significantly enhancing the robustness of the bandwidth assessment.

According to an embodiment, the correlations of the plurality of correlations are computed simultaneously.

According to an embodiment, the first plurality of samples representative of a first signal of the frame are received at each primary WLAN channel of at least two antennas and/or the second plurality of samples representative of a second signal of the frame are received at each secondary WLAN channel of at least two antennas; and the computing step computes at least a correlation of a sample among the first plurality of samples received at a primary WLAN channel of a first antenna among the at least two antennas with a sample among the second plurality of samples received at a secondary WLAN channel of a second antenna among the at least two antennas. This multi-antenna embodiment allows significantly enhancing the robustness of the bandwidth assessment.

According to an embodiment, the frame is a green-field frame. According to another embodiment, the frame is a mixed format (MF) frame, legacy and legacy duplicate (non-HT duplicate) frame.

According to an embodiment, all the steps of the method are executed at least by a processor.

According to another embodiment, the invention relates to a computer-program product or non-transitory computer-readable medium that contains software program instructions, where execution of the software program instructions by at least one data processor results in performance of operations that comprise execution of the method according to any one of the embodiment of the invention.

According to another embodiment, the invention relates to a device for setting the bandwidth of a receiver for a wireless local area network (WLAN). The device comprises at least:
- at least a correlator configured to compute at least a correlation of a first sample representative of a first signal received at a primary WLAN channel of the receiver with a second sample representative of a second signal of the frame received at a secondary WLAN channel of the receiver;
- a decision logic configured to set the receiver bandwidth to a first bandwidth if the correlation exceeds a threshold and is configured to set the receiver bandwidth to a second bandwidth if the correlation is less than the threshold.

According to a non-limitative embodiment, the threshold is a fixed value. According to another embodiment, the threshold is not fixed and can be calculated according to a number of different methods. According to an advantageous embodiment, the device also comprises a reference level estimator configured to estimate a threshold based on a sample representative of the first signal received at the primary WLAN channel and/or based on a sample representative of the second signal received at the secondary WLAN channel.

According to another embodiment, the invention relates to a system comprising a receiver for a wireless local area network (WLAN), comprising at least an antenna,
an analog to digital converter (ADC) coupled to the antenna and configured to generate: at least the first sample representative of a first signal received at a primary WLAN channel of the receiver and the second sample representative of a second signal of the frame received at a secondary WLAN channel,
a device for setting the bandwidth of the receiver according to the invention.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1A:
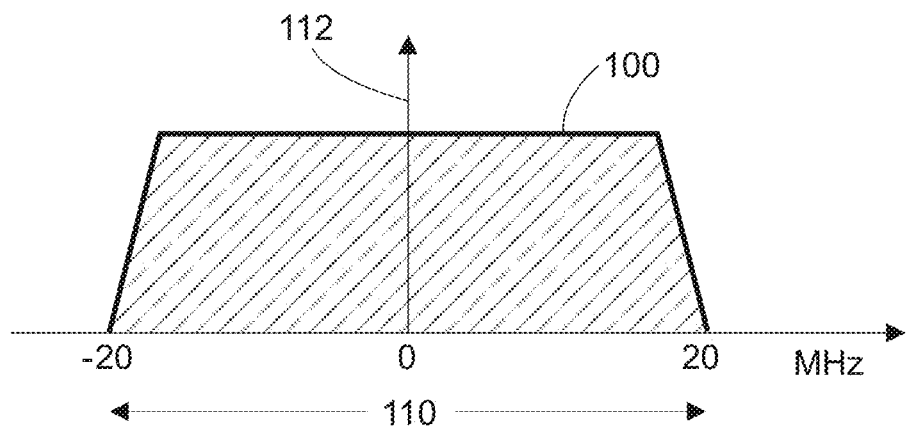
FIG. 1 illustrates how the primary and secondary 20 MHz channels are located in a 40 MHz channel.
Figure 1B:
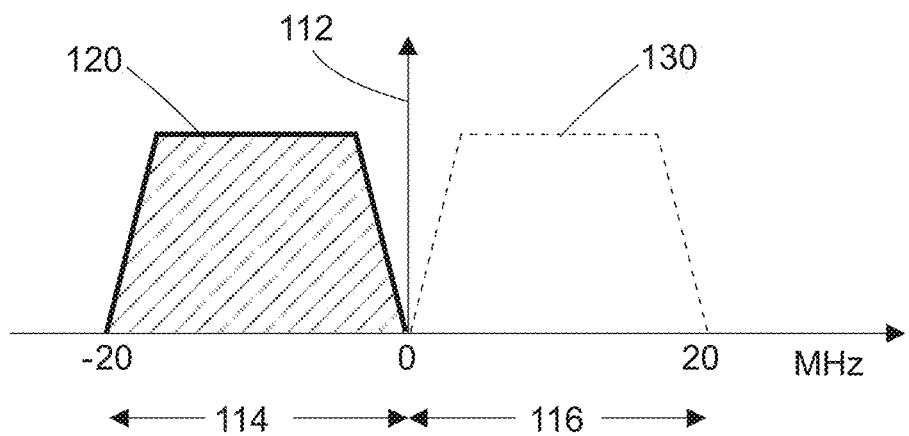
Figure 1C:
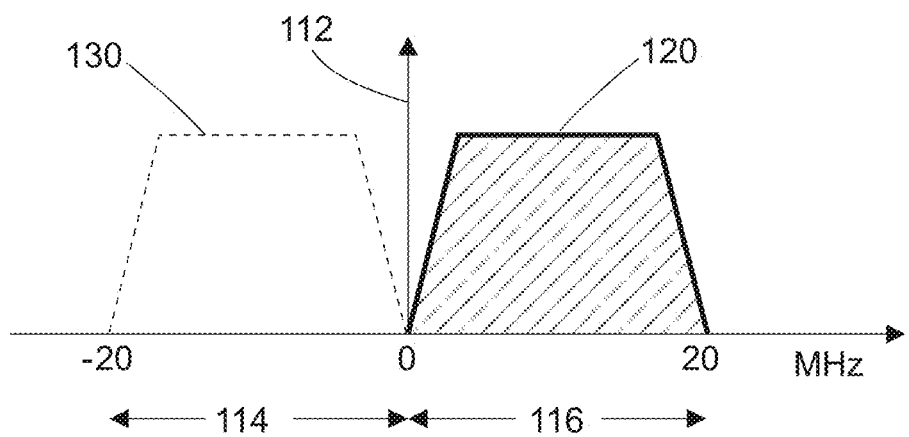
Figure 2A:
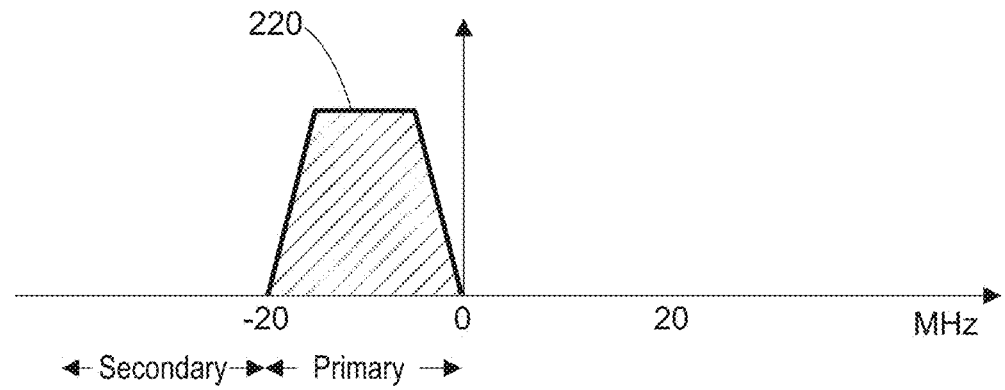
FIG. 2 shows examples of 20 and 40 MHz channels in an 80 MHz channel.
Figure 2B:
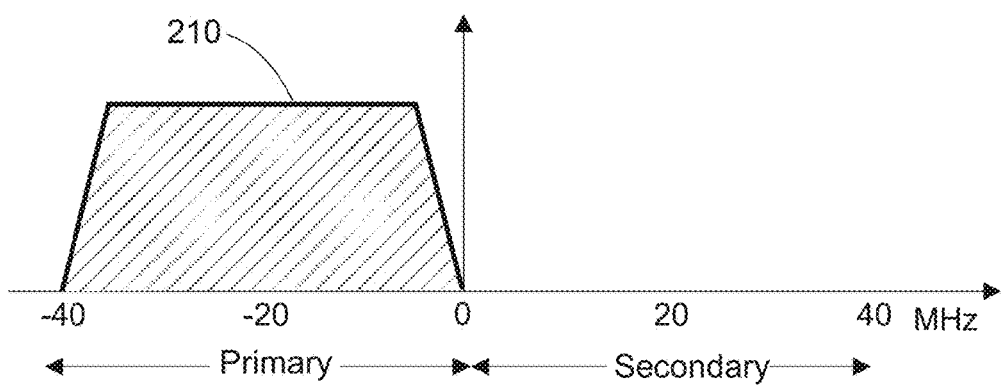
Figure 2C:
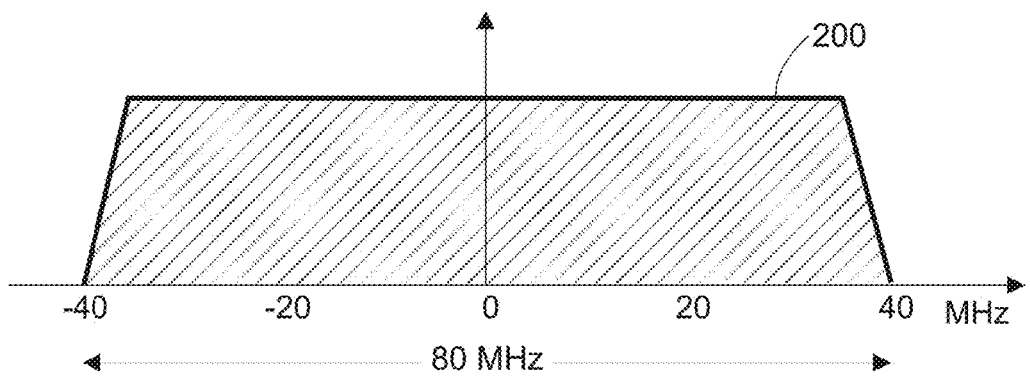
Figure 3:
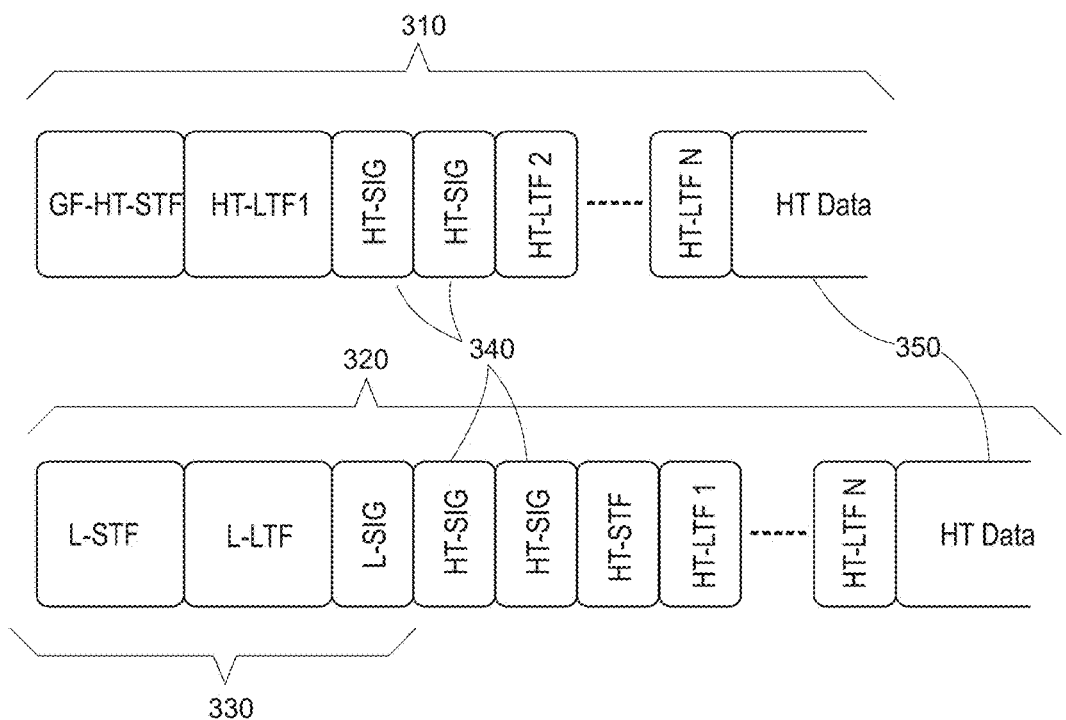
FIG. 3 shows preamble structures of frames exchanged in an 802.11 wireless network.
Figure 4:
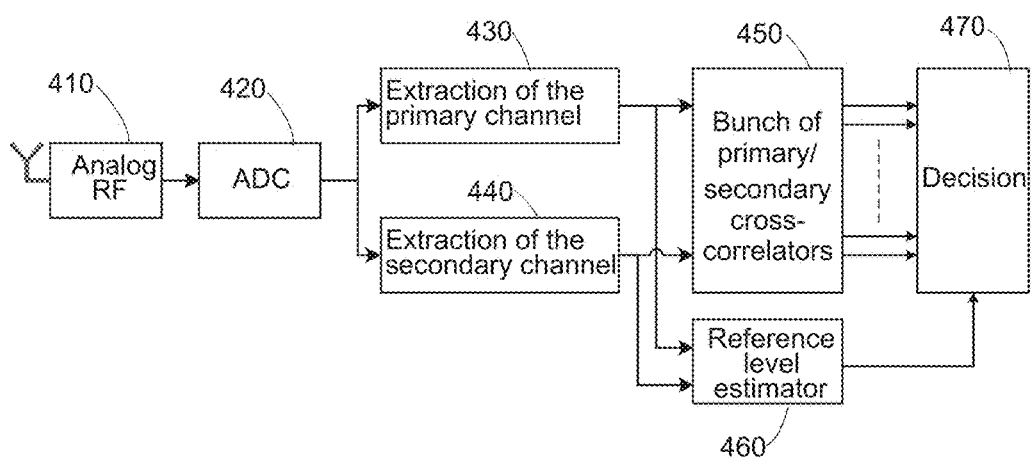
FIG. 4 is a block diagram of an example of a system according to an embodiment of the invention.

FIG. 4 illustrates the overall operating principle of the invention which is based on the detection of correlation properties between the signals composing the primary and the secondary channels during the reception phase of the legacy preamble 330. According to a preferred embodiment, the detection is performed during the reception phase of the STF field.

After reception of the RF signal 410, a sampling of the analog signal and conversion to numeric values of the samples is done thanks to an analog to digital converter (ADC) 420. The next operation consists in extracting the primary and secondary channels, 430 and 440, from the corresponding frequency range of the received signal. This operation is advantageously achieved using a plurality of band pass filters and frequency shifting operations.

Figure 9:
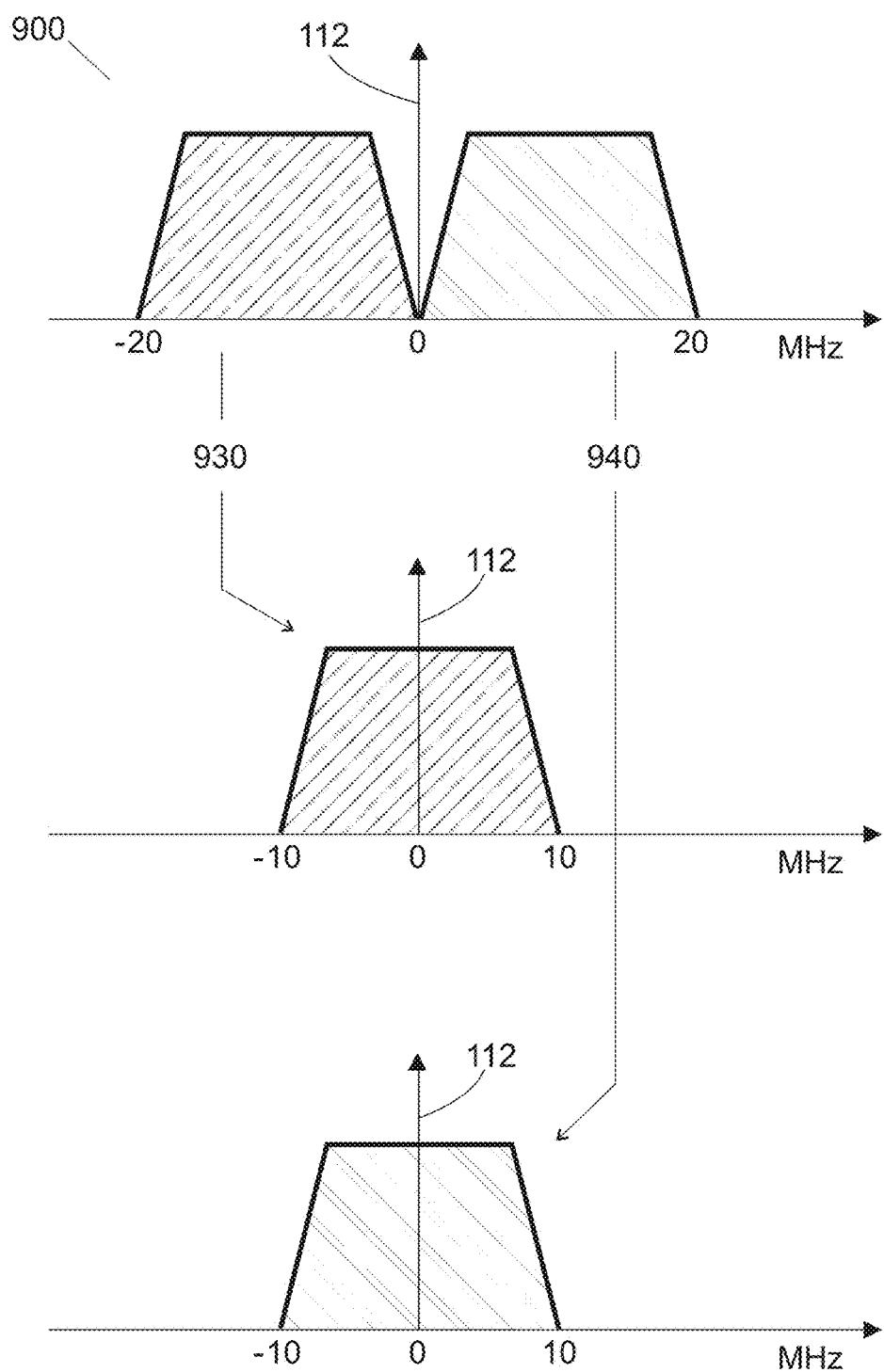
FIG. 9 illustrates an operation of frequency shifting of incoming signals.

As shown on FIG. 9 a frequency shifting of incoming signals consists in multiplying in the domain of complex numbers a sequence of samples x(n), taken at sampling frequency fs, by following expression: $\exp(j*2*pi*dF/fs*n)$. This allows central frequency of the received sequence to be shifted by a fixed factor dF so that the output spectrum of blocks 430 and 440, respectively, 930 and 940, be aligned on the central frequency 112 after extraction of the corresponding channels from the ADC block 420. The primary and secondary channels are extracted from ADC output spectrum 900.

Then, the signal received on the primary band and the one received on the secondary band are cross-correlated 450. Several cross-correlations, with different timing offsets between the two signals, can be optionally performed in parallel to improve the effectiveness of the detection. The correlators are described in FIGS. 5 and 6 hereafter.

All correlation outputs are then sent to a decision block 470. In one particular example of implementation, described later on, the decision is made by comparing the largest modulus correlation result with a threshold. This threshold can also be referred to as a weighted reference level which is assessed, for example, through an estimation of the received power performed by the reference level estimator 460 from outputs of blocks 430 and 440, i.e., after extraction of the primary and secondary channels.

It is worth noting here that an estimation of this reference level could be achieved in many ways different from the above particular example. Especially, if the level of reception can be maintained within tight margins, e.g., thanks to an efficient gain control of the receiving path, then the reference level could just be a fixed value. On the contrary, if the power of the input signal is susceptible to vary significantly from one frame reception to the other, it is then important to make the bandwidth detection algorithm independent from the input signal power. As mentioned above, this can be achieved, for example, by adjusting the detection threshold as a function of the input power. In this case, the detection threshold may be obtained in multiplying the sum of powers of the signals inputted to the correlation blocks by a weighting factor. Power estimations are obtained by accumulating the square of the modulus of the signals. The accumulation duration should typically be the same as the one of the cross-correlators. This condition is not mandatory but is advantageous because since the accumulation is done on the same period it is not necessary to divide by the period duration before comparing both components. The weighting factor allows a tradeoff value to be set that prevents both misdetection and false detections of received frames from occurring.

Figure 5:
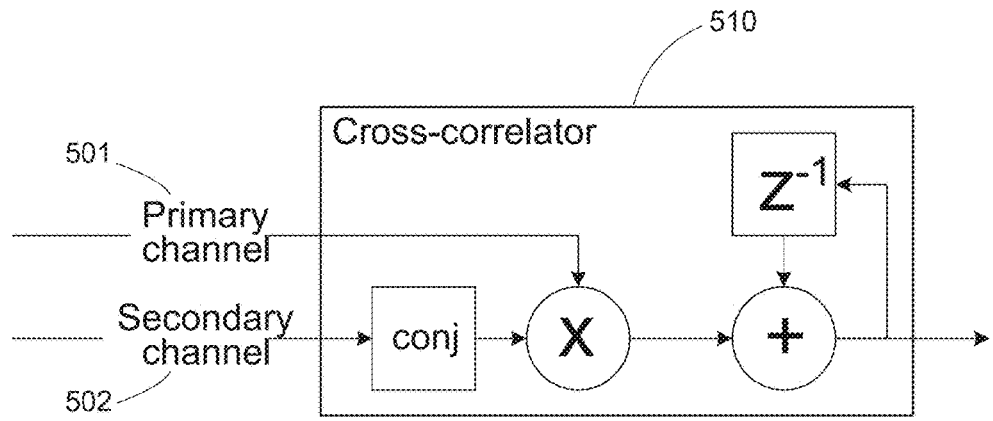
FIG. 5 illustrates a two-input cross-correlator.

If the correlation result is superior to the reference level, this means that the primary and secondary signals are indeed correlated; thus the bandwidth of the current frame includes the primary and the secondary channels. Otherwise, primary and secondary channels are not correlated, thus the frame bandwidth is equal or less then the primary channel band. Hence, in the first case, for example, a 40 MHz frame is detected while, in the second case, frame bandwidth is only 20 MHz FIG. 5 shows the individual correlators used to compare signals extracted from the primary and secondary channels. The correlator 510 is configured to compute a correlation of a first sample representative of a signal received at the primary channel with a second sample representative of a second signal received at the secondary channel. All modern signal processing systems, including the system of the invention, are operating in the complex domain of numbers. Then, the signals extracted from the primary and secondary channels are complex numbers with real and imaginary components. The cross-correlator 510 is working by multiplying, for example, the complex signal coming from the primary channel by the complex conjugate of the one coming from the secondary channel. Hence, if signals are identical in both channels, one gets a real number, equal to the square of the modulus of the complex numbers. The result is then accumulated to be delivered to the decision logic bloc 470.

Afterwards or simultaneously, the reference level estimator 460 estimates the threshold based on a sample representative of the first signal received at the primary channel and/or of the second signal received at the secondary channel. The reference level estimator is then delivered to the decision logic bloc 470.

The decision logic bloc 470 sets the receiver bandwidth to a first bandwidth (40 MHz for instance) if the correlation exceeds the threshold or sets the receiver bandwidth to a second bandwidth (20 MHz for instance) if the correlation is less than the threshold.

The sampling rate of the cross-correlation input signals is typically equal to the bandwidth of the channel they are representing. Hence, if the primary and secondary channels are 20 MHz wide channels, each input to a cross-correlator is a 20 mega samples per second (MS/s) sequence producing in turn a 20 MS/s output sequence. Typically, 64 samples (representing 3.2 µs, i.e., 3.2×20=64) of this output sequence are summed up. The number of accumulated samples should be as large as possible to improve the accuracy of the estimation. The estimation must preferably be completed before the end of the STF field to be useful while it can start only once the packet detection and the RF/analog gains adjustment are done. This leaves typically a time period of 3.2 µs of STF signal available for this processing. As already noted before, the accumulation period of the reference level estimator should preferably be the same as the one of the cross-correlators, since it is then not necessary to divide by the period duration before comparing both components.

According to a non-limitative embodiment of the invention, the correlation is computed on the first field of the incoming frame. Typically, this frame is a STF (Short Training Field), for instance a L-STF (Long-STF) or a GF-HT-STF (Green Field-High Throughput-STF) could be used as well.

With a time duration for decoding a STF field of approximately 8 µ seconds, the invention is configured so as to detect the frame during a first portion of this time duration, preferably less than 4.8 µs and so as to assess the frame bandwidth during the remaining time of this duration. Assessing the frame bandwidth with the invention does not take more than 3.2 µs. Therefore, once the STF field has been entirely received and decoded, the frame bandwidth is known. Thus the invention does not delay the remaining reception and decoding process for the incoming frame.

Figure 6:
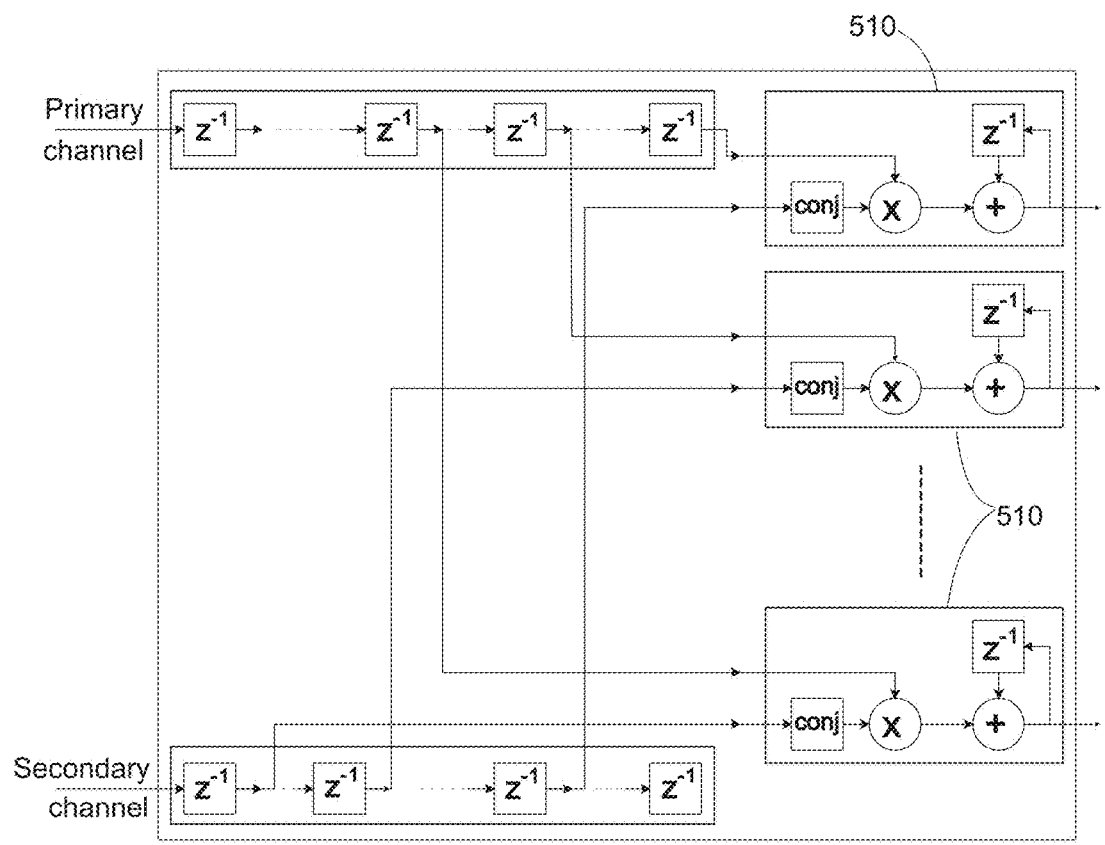
FIG. 6 shows an example of how cross-correlators can be fed from signals extracted from the primary and secondary channels.

In order to make the system more robust in particular against multipath propagation that frequently occurs in confined areas, it is advantageous to perform such a cross-correlation at different time intervals, i.e., over different time samples of the input signals. Thus, a system according to the invention preferably includes several cross-correlators. Both inputs of each correlator are then each connected to different time samples of the primary and secondary channels. FIG. 6 shows an example of such an implementation of the invention. The number of cross-correlators used is determined by the level of performance expected from a particular implementation of the invention. A tradeoff between complexity of implementation and performance may have to be exercised. The optimal relative delay between the input signals depends on the environment. In the exemplary implementation of FIG. 6, three correlators 510 are run in parallel with various relative delays between the primary and the secondary signals applied on the pair of inputs of each correlator.

Figure 7:
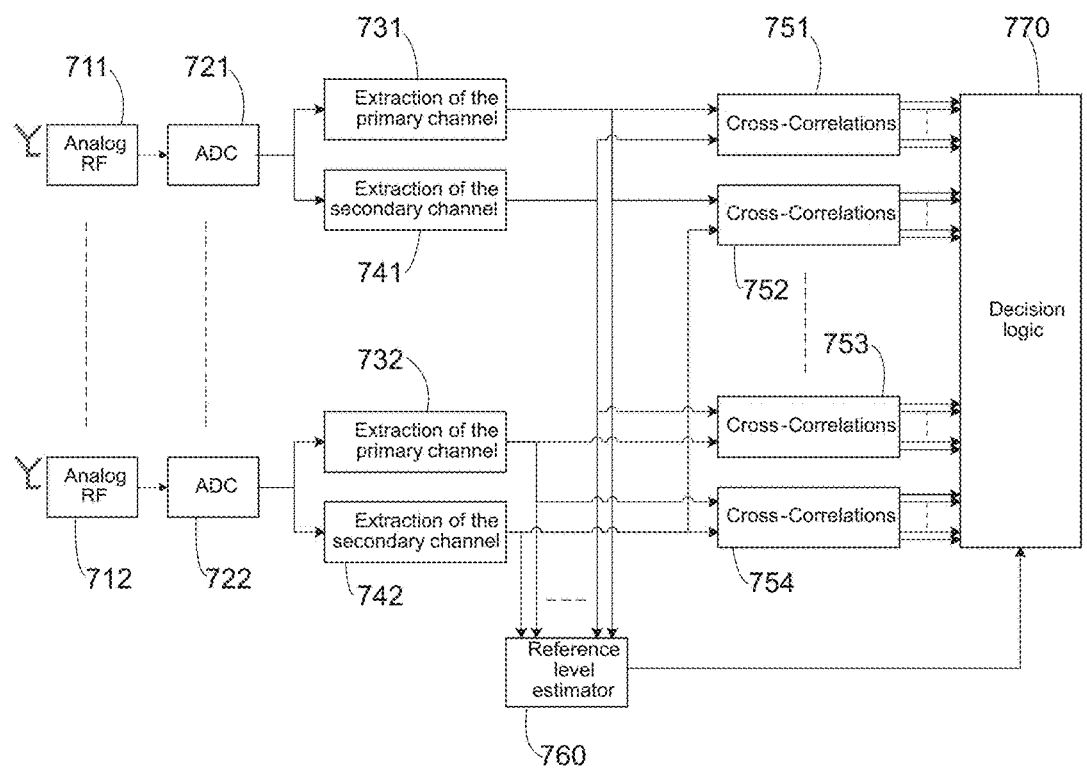
FIG. 7 illustrates a system according to another embodiment of the invention that operates in a MIMO or multi-antenna environment.

FIG. 7 shows the implementation of the invention in a multi-antenna environment. Version 802.11n of the standards has introduced a so-called MIMO mode of operation, i.e.: a "multiple-input, multiple-output" mode where STA and AP are possibly equipped with a transmitter having multiple antennas transmitting through the propagation environment to a receiver having multiple receive antennas. In this context, the invention can be carried out as illustrated in the particular example of FIG. 7. In this case, cross correlations can be advantageously performed over primary and secondary channels coming from different antennas thus creating a plurality of combinations.

Each antenna 711, 712, 71i is respectively associated to an ADC 721, 722, 72i and to a extraction bloc for extracting the primary channel 731, 732, 73i and the secondary channel 741, 742, 74i of its associated antenna.

A common reference estimator 760 collects the samples of the primary 731, 732, 73i and secondary 741, 742, 74i channels.

Correlators 751, 752, 753, 75i receive each a sample from the primary channel 731, 732, 73i of any antenna 711, 712, 71i and a sample from the secondary channel 741, 742, 74i of any antenna 711, 712, 71i.

The correlations are provided to a decision logic bloc 770 for assessing the frame bandwidth.

For instance, in this exemplary embodiment:

A correlator 751 correlates the primary band signal 731 from a first antenna 711 with the secondary band signal 741 from said first antenna 711;

A correlator 752 correlates the primary band signal 731 from a first antenna 711 with the secondary band signal 742 from a second antenna 712;

A correlator 753 correlates the primary band signal 732 from a second antenna 712 with the secondary band signal 741 from the first antenna 711.

A correlator 754 correlates the primary band signal 732 from the second antenna 712 with the secondary band signal 742 from said second antenna 712;

Preferably, an embodiment of the invention combines the embodiment described with reference to FIG. 6 (multi correlations at various time intervals) and the embodiment described with reference to FIG. 7 (correlations of samples from multi antenna).

Figure 8:
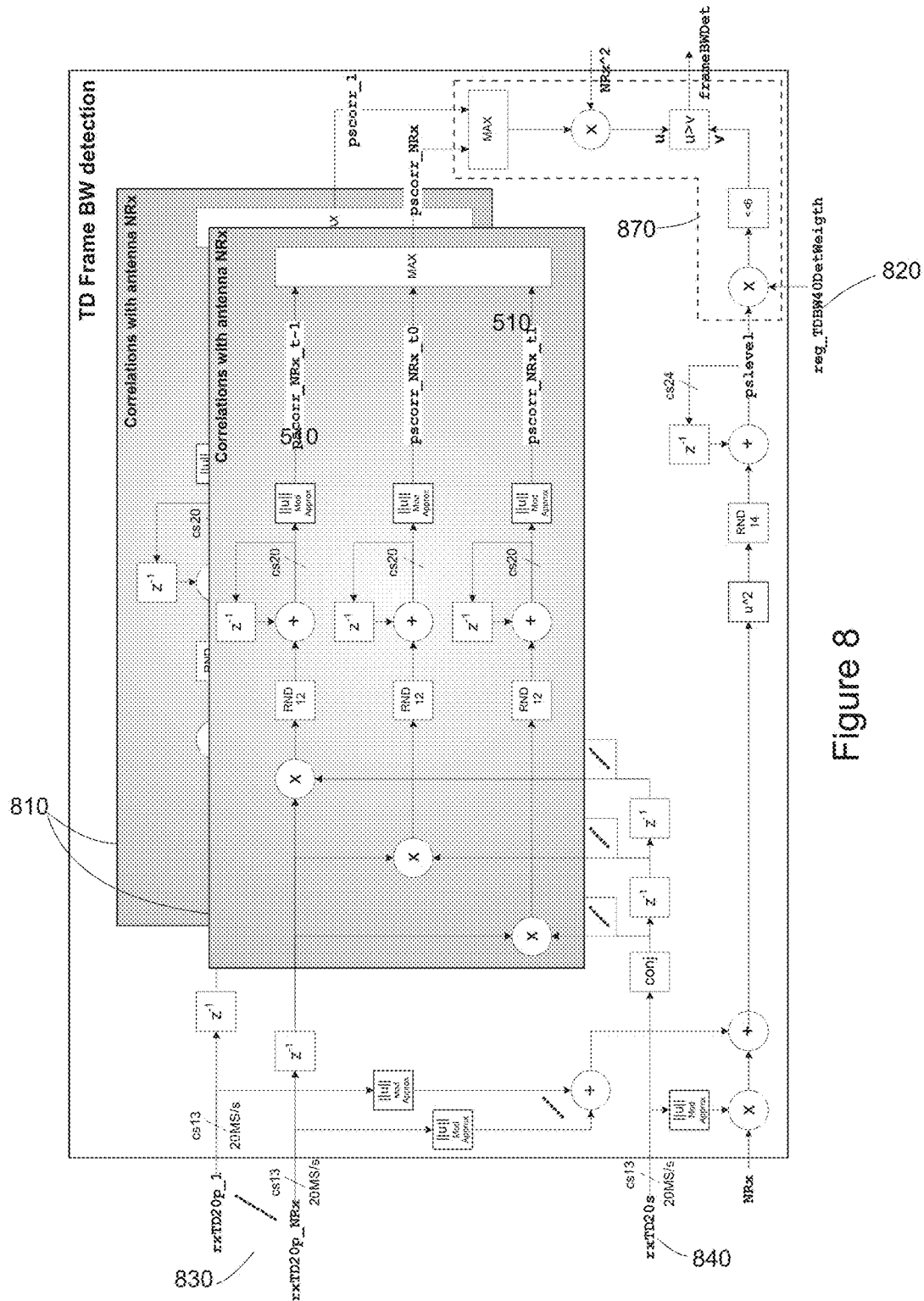
FIG. 8 is a block diagram of a decision logic block for getting an early assessment of the bandwidth (20 MHz or more) used by the received frames according to an embodiment of the invention.

FIG. 8 describes an exemplary logic block implementing the invention and thus aimed at detecting if the bandwidth of the frame being received is 20 MHz or if it is higher, i.e., 40 or 80 MHz. In this example, decision block 470 or 770, shown respectively in FIGS. 4 and 7, includes here logic blocks comprised into reference 870.

In the example of FIG. 8 the secondary band is available from only one of the antenna. Thus, all the primary band signals from all the antennas are correlated with the same secondary band signal.

In a 40 MHz transmission BSS, the L-STF is constructed from the 20 MHz STF by duplicating and frequency shifting and by rotating the upper subcarrier by 90. Then, each sub-band may be affected by different steering matrices (Q) and different multi-paths. Moreover, different cyclic shifts are applied on each spatial stream.

Let define:
$rp_k^{STF}$ a time domain representation of signal received on antenna k during STF field in the 20 MHz primary band
$rs_l^{STF}$ same definition as above on the secondary band and for antenna l.

$$rp_k^{STF}(n) = e^{2j\pi n\Phi} \sum_t hp_k(t)s(n-t)$$

$$rs_l^{STF}(n) = e^{2j\pi n\Phi} \sum_t hp_l(t)s(n-t)$$

There exist filters $hp_k(z)$ and $hs_l(z)$ such that in a no noise environment the above formulas are valid with below definition.

s is a time domain representation of the transmitted STF
$\Phi$ represents the frequency offset Because of the relation linking the signals transmitted on each subband, the signals received on each subband can be expressed as a function of the same transmitted sequence, for example the one transmitted on the lower subband.

The algorithm implemented by FIG. 8 is based on the correlation properties that may be found between samples coming from the primary band and samples from the secondary band.

If the current frame bandwidth is 40 MHz, the primary and secondary bands are indeed correlated. Then, $$E[rp_k^{STF}(n)rs_l^{STF}(n-\Delta)^*] =$$

$$e^{j2\pi\Delta\Phi} \sum_t \sum_{t'} hp_k(t)hs_l(t')^* \underbrace{E[s(n-t)s(n-\Delta-t')^*]}_{M_{kl}(i,j,\Delta)}$$

$M_{kl}(i,j,\Delta)$ are not null complex values. Thus, $E[rp_k(n)rs_l^*(n-\Delta)]$ is also not null. Hence, depending on $hp_k(z)$, $hs_l(z)$ and $\Delta$ components, some more or less large modulus values can be expected to be detected in this case.

On the contrary, if the current frame bandwidth is 20 MHz, the signal on the secondary band is made of noise or interferences, in any case it is not a STF field. Thus, no correlation should then be found, $$E[rp_k^{STF}(n)rs_l^{STF}(n-\Delta)^*]=0$$

A better estimation of the expected values is obtained by accumulating the product of the primary signal with the conjugate of the secondary one with different delay $\Delta$.

$$L_{kl}(M) = \sum_{n=1}^{M} |rp_k(n)|^2 + |rs_l(n)|^2$$

Moreover, an estimation of the signal power is obtained as follows:

$$C_{kl}^{\Delta}(M) = \sum_{n=1}^{M} rp_k(n)rs_l(n-\Delta)^*$$

The bandwidth detection algorithm consists in comparing the maximal modulus of the average correlation, also referred to as the correlation measure with the power of all the signals. Thus, if $\max_{k,l,\Delta} |C_{kl}^{\Delta}(M)| <$ $$\alpha \sum_{k,l} L_{k,l}(M) \begin{array}{l} \text{then} \quad \text{bandwidth estimation is 20 MHz} \\ \text{otherwise} \quad \text{bandwidth estimation is 40 MHz or more} \end{array}$$

α is a weighting parameter that allows the misdetection rate to be adjusted in favor of a 20 or 40 MHz bandwidth.

FIG. 8 shows an exemplary fixed-point block diagram implementation of the invention. Each box 810 includes, for one antenna, the computation of the three correlation measures denoted: pscorr_k_t-1 812, pscorr_k_0 814, and pscorr_k_t1 816.

If the largest correlation measure is superior to the sum of all powers then the frame is identified as a 40 MHz frame. Otherwise, it is a 20 MHz frame. A programmable weight reg_TDBW40DetWeight 820 allows the probability of error to be adjusted in favor of one of the two decisions to be made, i.e.: detection of a 20 or 40 MHz bandwidth The default value of reg_TDBW40DetWeight is 22.

The assessment of the detected bandwidth is started as soon as the "automatic gain control" or AGC of the RF receiver has completed, at the same time than the coarse frequency estimation is done. The coarse frequency offset estimation is a processing classically performed on the received L-STF to estimate its frequency offset, i.e., the offset observed between the carrier frequency of the transmitter versus the one of the receiver. This estimation is usually obtained by performing an auto-correlation on the received signal with a time lag of 0.8 μs. The assessment is stopped and frozen when STF field ends which is indicated by a trigger generated by a time synchronization block part of the standard logic blocks of such a receiver and, at the latest, 3.2 μs after bandwidth assessment has started.

In the particular implementation of FIG. 8, in order to save hardware, i.e., to reduce the number of logic gates needed in the front-end part, the 20 MHz secondary-band samples are computed on only one of the NRx antennas. Thus, in multi-antenna configuration, each primary path, rxTD20p_k 830 is only correlated with a single secondary path, rxTD20s 840.

On the other hand, performance simulation shows that a good detection rate can be obtained when correlation measures are available for the following set of Δ values: −1, 0 and +1. This means that, on each antenna, three correlations are performed in parallel with the corresponding delayed versions of the secondary path.

Figure 10:
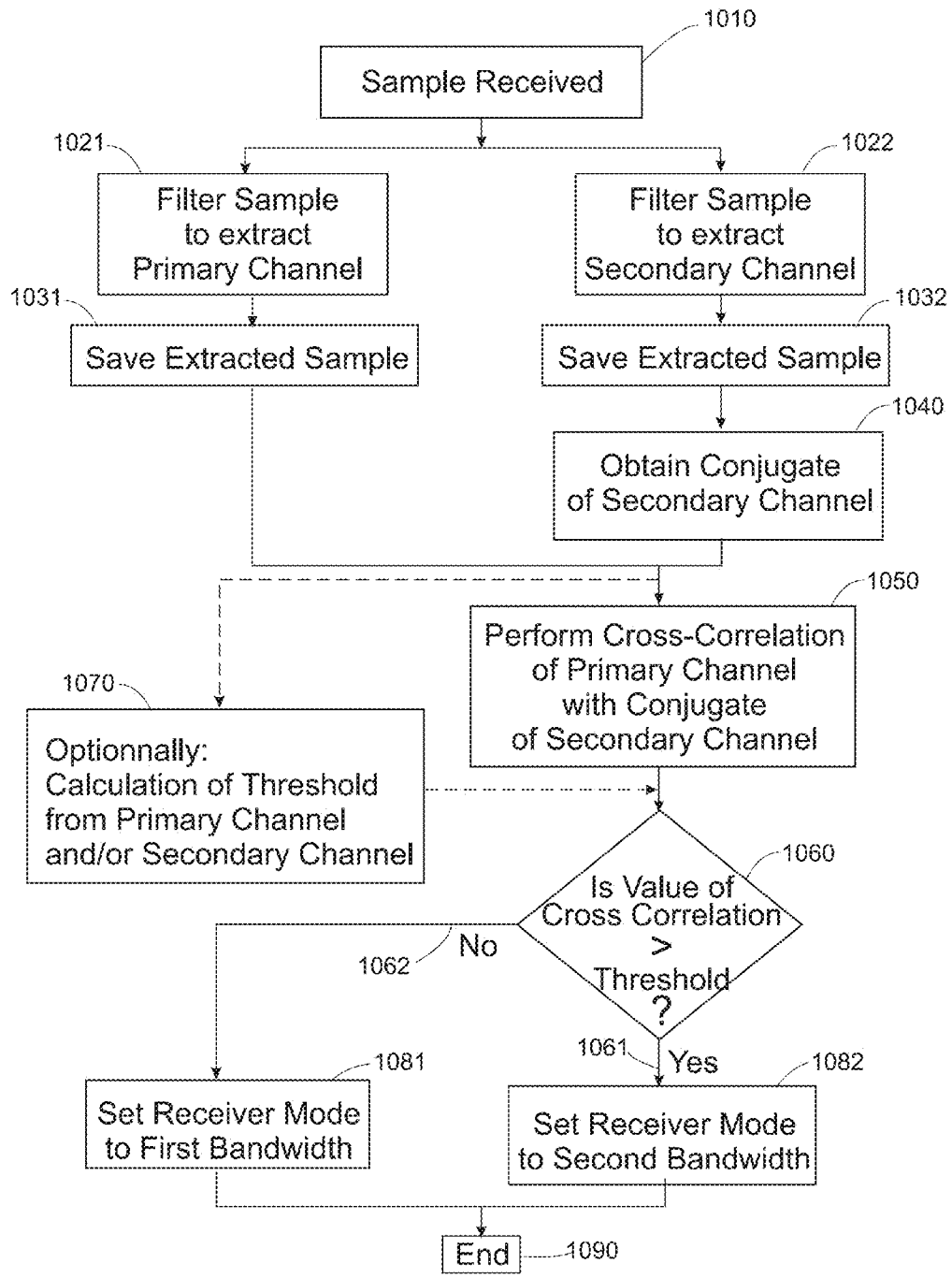
FIG. 10 shows the steps of the method of the invention.

FIG. 10 shows the steps of the method of the invention. Upon reception of a sample 1010 of an inbound frame coming, e.g., from frame STF field, a frequency filtering is applied on it to extract the spectral components of the primary channel 1021 and of the secondary channel 1022. These values are subsequently stored, 1031 and 1032.

Then, the conjugate of the complex values representing, for example, the spectral composition of the secondary channel, are computed 1040. This allows complex sample values from primary and secondary channels to be cross correlated 1050. It should be noted that while the previous description proposes that the cross correlation is performed base on a sample of the primary channel and the conjugate of a sample of the secondary channel, the invention encompasses embodiments where the cross correlation is performed base on the conjugate of a sample of the primary channel and a sample of the secondary channel.

After this step, the result of cross correlation thus obtained can be compared 1060 so as to determine if it is larger 1061 than a given threshold, or not 1062. As mentioned previously, threshold can optionally be set to a fixed value. This is possible if the level of reception can be efficiently monitored. If the level of reception is susceptible to vary significantly from one frame reception to the other, then a weighting factor may, optionally, be computed 1070 so that the threshold is adapted accordingly. The weighting factor is derived, for example, from the received power found in primary and/or secondary channel.

After comparison 1060, the receiver can thus be set into a mode adapted to receive a first 1081 or a second type of bandwidth 1082, i.e., for example, adapted for receiving a 20 MHz wide bandwidth or a larger one.

This ends 1090 the process of determining on the fly which channel width is to be received.

The foregoing description has provided, by way of exemplary and non-limiting examples, a full and informative description of various methods, apparatus for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent algorithms and data representations may be attempted by those skilled in the art. Further, the various names used for the different elements and functions (e.g., correlation block, reference level estimator etc.) are merely descriptive and are not intended to be read in a limiting sense, as these various elements and functions can be referred to by any suitable names. All such and similar modifications of the teachings of this invention will still fall within the scope of the claims of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

The invention claimed is:

1. A method, carried out by an electronic device including a wireless network interface device, for determining the bandwidth of an incoming frame in a wireless local area network (WLAN), comprising the following steps:
   upon reception, via the wireless network interface, of a first plurality and a second plurality of samples of the frame, the first plurality of samples being representative of a first signal of the frame received at a primary WLAN channel, and the second plurality of samples being representative of a second signal of the frame received at a secondary WLAN channel:
   computing at least a correlation of a sample among the first plurality of samples with a sample among the second plurality of samples; and
   in the event that the computed correlation exceeds a predetermined threshold, setting a receiver mode to a first bandwidth, and otherwise setting the receiver mode to a second bandwidth different from said first bandwidth.

2. The method according to claim 1, wherein the frame is formed of a plurality of fields and wherein the steps of computing a correlation and of setting a receiver mode are executed and completed during the reception of a first field of the frame.

3. The method according to claim 2, wherein the first field of the frame is a short training field (L-STF; GF-HT-STF).

4. The method according to claim 3, wherein the second field of the frame is a long training field (L-LTF; HT-LTF1) and a subsequent field comprises a SIG field.

5. The method according to claim 1, wherein said samples among the first and second pluralities of samples are complex signals and wherein the correlation comprises multiplying:
- one among: said sample among the first plurality of samples and said sample among the second plurality of samples with;
- the conjugate of the other among: said sample among the first plurality of samples and said sample among the second plurality of samples.

6. The method according to claim 1, wherein said samples among the first and second pluralities of samples are complex signals and wherein said threshold is computed by calculating the square of the modulus of at least a sample among said first and/or second plurality of samples.

7. The method according to claim 1, wherein the first and second pluralities of samples are sampled from the incoming frame at a first sampling rate, wherein said threshold is calculated by multiplying a weighting factor by the sum of the powers of samples sampled from the incoming frame at a second sampling rate and wherein the first and second sampling rates being equal.

8. The method according to claim 1, wherein:
- the first WLAN channel is a 20 MHz bandwidth primary channel of a 40 MHz bandwidth channel, the secondary WLAN channel is a 20 MHz bandwidth second channel of the 40 MHz bandwidth channel, said first bandwidth being 40 MHz and said second bandwidth being 20 MHz, or
- the first WLAN channel is a 40 MHz bandwidth primary channel of a 80 MHz bandwidth channel, the secondary WLAN channel is a 40 MHz bandwidth second channel of the 80 MHz bandwidth channel, said first bandwidth being 80 MHz and said second bandwidth being 40 MHz.

9. The method according to claim 1, wherein the step of computing at least a correlation comprises computing simultaneously a plurality of correlations, and wherein the samples among the first and second pluralities of samples taken into account for each correlation of the plurality of correlations present a different relative delay.

10. The method according to claim 9, wherein the correlations of the plurality of correlations are computed simultaneously.

11. The method according to claim 1, wherein the first plurality of samples representative of a first signal of the frame are received at each primary WLAN channel of at least two antennas and/or the second plurality of samples representative of a second signal of the frame are received at each secondary WLAN channel of at least two antennas; and wherein the computing step computes at least a correlation of a sample among the first plurality of samples received at a primary WLAN channel of a first antenna among the at least two antennas with a sample among the second plurality of samples received at a secondary WLAN channel of a second antenna among the at least two antennas.

12. The method according to claim 1, wherein the frame is a green-field frame.

13. A non-transitory computer-readable medium on which is stored software program instructions, where execution of the software program instructions by at least one data processor results in performance of operations that comprise execution of the steps of the method as in claim 1.

14. The method according to claim 1, wherein the electronic device is provided with signal processing components in communication with the wireless network interface for carrying out the steps of the method.

15. The method according to claim 1, wherein the electronic device is provided with a data processor in communication with the wireless network interface and with a data storage device, the data storage device having a software program stored thereon that, upon execution by the data processor, causes the steps of the method to be carried out.

16. A device for setting the bandwidth of a receiver for a wireless local area network (WLAN), comprising:
- at least a correlator configured to compute at least a correlation of a first sample representative of a first signal received at a primary WLAN channel of the receiver with a second sample representative of a second signal of the frame received at a secondary WLAN channel of the receiver; and
- a decision logic bloc configured to set the receiver bandwidth to a first bandwidth if the correlation exceeds a threshold and is configured to set the receiver bandwidth to a second bandwidth if the correlation is less than the threshold.

17. A system comprising:
- the device for setting the bandwidth of the receiver according to the claim 16; and
- a receiver for a wireless local area network (WLAN), said receiver comprising
  - at least one antenna, and
  - an analog to digital converter (ADC) coupled to the at least one antenna and configured to generate: at least the first sample representative of a first signal received at a primary WLAN channel of the receiver and the second sample representative of a second signal of the frame received at a secondary WLAN channel.

18. A method, carried out by an electronic device equipped with a wireless network interface, for determining the bandwidth of an incoming frame in a wireless local area network (WLAN), comprising:
- receiving, via the wireless network interface, a first plurality of samples of the frame, the first plurality of samples being representative of a first signal of the frame received at a primary WLAN channel;
- receiving, via the wireless network interface, a second plurality of samples of the frame, the second plurality of samples being representative of a second signal of the frame received at a secondary WLAN channel;
- computing at least a correlation of a sample among the first plurality of samples with a sample among the second plurality of samples; and
- in the event that the computed correlation exceeds a predetermined threshold, setting a receiver mode of the network communications device to a first bandwidth, and otherwise setting the receiver mode to a second bandwidth different from said first bandwidth.

19. The method according to claim 18, wherein the electronic device is provided with signal processing components in communication with the wireless network interface for carrying out the steps of the method.

20. The method according to claim 18, wherein the electronic device is provided with a data processor in communication with the wireless network interface and with a data storage device, the data storage device having a software program stored thereon that, upon execution by the data processor, causes the steps of the method to be carried out.

* * * * *